(12) United States Patent
Tsuchita

(10) Patent No.: US 8,976,234 B2
(45) Date of Patent: Mar. 10, 2015

(54) METHOD FOR CONTROLLING DISPLAY OF STEREOSCOPIC IMAGE, APPARATUS FOR CONTROLLING DISPLAY OF STEREOSCOPIC IMAGE, AND IMAGING APPARATUS

(71) Applicant: FUJIFILM Corporation, Tokyo (JP)

(72) Inventor: Akiyoshi Tsuchita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/228,797

(22) Filed: Mar. 28, 2014

(65) Prior Publication Data

US 2014/0210962 A1    Jul. 31, 2014

Related U.S. Application Data

(63) Continuation of application No. PCT/JP2012/070664, filed on Aug. 14, 2012.

(30) Foreign Application Priority Data

Sep. 29, 2011  (JP) .................................. 2011-215646

(51) Int. Cl.
  *H04N 13/04*   (2006.01)
  *H04N 13/00*   (2006.01)
(52) U.S. Cl.
  CPC ....... *H04N 13/0409* (2013.01); *H04N 13/0022* (2013.01); *H04N 13/0497* (2013.01)
  USPC ......................................................... 348/54
(58) Field of Classification Search
  CPC .......... H04N 13/0022; H04N 13/0497; H04N 13/0409
  See application file for complete search history.

(56) References Cited

U.S. PATENT DOCUMENTS

| 8,044,997 B2 | 10/2011 | Masuda et al. |
| 2008/0106550 A1 | 5/2008 | Tokumo et al. |
| 2009/0244268 A1 | 10/2009 | Masuda et al. |

FOREIGN PATENT DOCUMENTS

| JP | 8-317429 A | 11/1996 |
| JP | 2009-239388 A | 10/2009 |

(Continued)

OTHER PUBLICATIONS

International Search Report, issued in PCT/JP2012/070664, dated Nov. 20, 2012.

(Continued)

*Primary Examiner* — Sath V Perungavoor
*Assistant Examiner* — Kate Luo
(74) *Attorney, Agent, or Firm* — Birch, Stewart, Kolasch & Birch, LLP

(57) ABSTRACT

An apparatus for controlling display of a stereoscopic image, includes: a display control portion which cuts out a stereoscopic image in a to-be-displayed area which is an area corresponding to a part of a stereoscopic image consisting of a plurality of images with a parallax, and displays the cut-out stereoscopic image on a display portion; a parallax change amount calculation portion which calculates a change amount between a parallax amount in a stereoscopic image within the to-be-displayed area before the to-be-displayed area is moved and a parallax amount in a stereoscopic image within the to-be-displayed area after the to-be-displayed area is moved by a first moving distance when an instruction to move the to-be-displayed area is issued; and a to-be-displayed area movement control portion which moves the to-be-displayed area by a moving distance in accordance with the change amount calculated by the parallax change amount calculation portion.

12 Claims, 12 Drawing Sheets

(56) References Cited

FOREIGN PATENT DOCUMENTS

| JP | 2010-154479 A | 7/2010 |
| JP | 2011-130403 A | 6/2011 |
| WO | WO 2006/019039 A1 | 2/2006 |
| WO | WO 2011/062110 A1 | 5/2011 |

OTHER PUBLICATIONS

Written Opinion of the International Search Authority, issued in PCT/JP2012/070664, dated Nov. 20, 2012.

METHOD FOR CONTROLLING DISPLAY OF STEREOSCOPIC IMAGE, APPARATUS FOR CONTROLLING DISPLAY OF STEREOSCOPIC IMAGE, AND IMAGING APPARATUS

CROSS REFERENCE TO RELATED APPLICATION

This is a continuation of International Application No. PCT/JP2012/070664 filed on Aug. 14, 2012, and claims priority from Japanese Patent Application No. 2011-215646 filed on Sep. 29, 2011, the entire disclosures of which are incorporated herein by reference.

TECHNICAL FIELD

The present invention relates to a method for controlling display of a stereoscopic image, an apparatus for controlling display of a stereoscopic image, and an imaging apparatus.

BACKGROUND ART

There are indications that television receivers which can display stereoscopic images (3D images) will be widespread and digital cameras (stereoscopic imaging apparatuses) which can take stereoscopic images of subjects will be also widespread. When a stereoscopic image obtained from images taken by such a stereoscopic imaging apparatus is displayed on a display portion of the stereoscopic imaging apparatus, an external display device (such as a large-screen television set), etc., a part of the displayed stereoscopic image may be enlarged and displayed in some cases.

There has been known a method for enlarging and displaying a stereoscopic image 92 within a display area 91 on the whole of a display surface of a display device when a user designates the display area 91 as a part of a stereoscopic image 90 in the state in which the stereoscopic image 90 has been displayed on the whole of the display surface of the display device, for example, as shown in FIG. 13.

As shown in FIG. 13, a subject 92R and a subject 92L generating a parallax amount d1 therebetween are contained in the stereoscopic image 92.

When the user moves the display area 91 to a position designated by the broken line in FIG. 13, a stereoscopic image 93 within the display area 91 after the movement is enlarged and displayed on the whole of the display surface of the display device.

As shown in FIG. 13, a subject 93R and a subject 93L generating a parallax amount d2 therebetween are contained in the stereoscopic image 93.

Here, when there is a large difference between the parallax amount d1 and the parallax amount d2, the parallax of the stereoscopic image displayed on the display device changes suddenly between before and after the movement of the display area 91. When the parallax changes suddenly thus, a sense of fatigue is given to the user viewing the image stereoscopically.

FIG. 13 will be described on the assumption that the size of the stereoscopic image 90 is the same as the display size of the display device or the size of the stereoscopic image 90 is compressed in advance so as to be accommodated in the display size of the display device. Here, the "size" of the image means the number of pixels constituting the image. The size of the image can be expressed as Wx×Wy where Wx designates the number of pixels in a horizontal direction of the image and Wy designates the number of pixels in a vertical direction of the image. In addition, the display size of the display device means the number of pixels which can be displayed on the display device. The display size of the display device can be expressed as Hx×Hy where Hx designates the number of pixels in a horizontal direction of the screen and Hy designates the number of pixels in a vertical direction of the screen.

Apart from the aforementioned assumption, assume that the size of the stereoscopic image 90 is larger than the display size of the display device, for example, assume that the size of a stereoscopic image inside the area 91 in FIG. 13 is the same as the size of the display device. In this case, when the area 91 is moved as described above, the parallax of the stereoscopic image displayed on the display device may change suddenly to thereby give a sense of fatigue to the user viewing the stereoscopic image.

A method for reducing a sense of fatigue given to a user when a scene of a stereoscopic image is changed has been disclosed in Patent Literature 1.

In addition, a method for changing a moving part of stereoscopic image from a stereoscopic display mode to a planar display mode during scroll display of the stereoscopic image has been disclosed in Patent Literature 2.

CITATION LIST

Patent Literature

Patent Literature 1: JP-A-2009-239388
Patent Literature 2: WO 2006/19039

SUMMARY OF INVENTION

Problems to be Solved by the Invention

However, according to the method described in Patent Literature 1, it is not possible to reduce a sense of fatigue given to the user when a stereoscopic image partially cut out is displayed and the cutout area of the image is moved.

In addition, according to the method described in Patent Literature 2, frequent switching is performed between a stereoscopic display mode and a planar display mode so as to give a sense of fatigue to the user.

The invention has been accomplished in consideration of the foregoing circumstances. An object of the invention is to provide a method for controlling display of a stereoscopic image and an apparatus for controlling display of a stereoscopic image which can reduce a sense of fatigue given to an observer when a stereoscopic image is scrolled and displayed, and an imaging apparatus provided with the method or apparatus for controlling display of a stereoscopic image.

Means for Solving the Problems

An apparatus for controlling display of a stereoscopic image according to the invention includes:

a display control portion which cuts out a stereoscopic image in a to-be-displayed area which is an area corresponding to a part of a stereoscopic image consisting of a plurality of images with a parallax, and displays the cut-out stereoscopic image on a display portion;

a parallax change amount calculation portion which calculates a change amount between a parallax amount in a stereoscopic image within the to-be-displayed area before the to-be-displayed area is moved and a parallax amount in a stereoscopic image within the to-be-displayed area after the to-be-displayed area is moved by a first moving distance when an instruction to move the to-be-displayed area is issued; and a to-be-displayed area movement control portion which moves the to-be-displayed area by a moving distance in accordance with the change amount calculated by the parallax change amount calculation portion.

A method for controlling display of a stereoscopic image according to the invention includes: a display control step of cutting out a stereoscopic image in a to-be-displayed area which is an area corresponding to a part of a stereoscopic image consisting of a plurality of images with a parallax, and displaying the cut-out stereoscopic image on a display portion; a parallax change amount calculation step of calculating a change amount between a parallax amount in a stereoscopic image within the to-be-displayed area before the to-be-displayed area is moved and a parallax amount in a stereoscopic image within the to-be-displayed area after the to-be-displayed area is moved by a first moving distance when an instruction to move the to-be-displayed area is issued; and a to-be-displayed area movement control step of moving the to-be-displayed area by a moving distance in accordance with the change amount calculated in the parallax change amount calculation step.

An imaging apparatus according to the invention includes: the aforementioned apparatus for controlling display of a stereoscopic image; the aforementioned display portion; an imaging portion which images subjects; and an image processing portion which generates stereoscopic image data for displaying the stereoscopic image, from a plurality of photographic image signals obtained by photographing with the imaging portion.

Advantageous Effects of Invention

According to the invention, it is possible to provide a method for controlling display of a stereoscopic image and an apparatus for controlling display of a stereoscopic image which can reduce a sense of fatigue given to an observer when a stereoscopic image is scrolled and displayed, and an imaging apparatus provided with the method or apparatus for controlling display of a stereoscopic image.

EMBODIMENTS FOR CARRYING OUT THE INVENTION

An embodiment of the invention will be described below with reference to the drawings.

Figure 1:
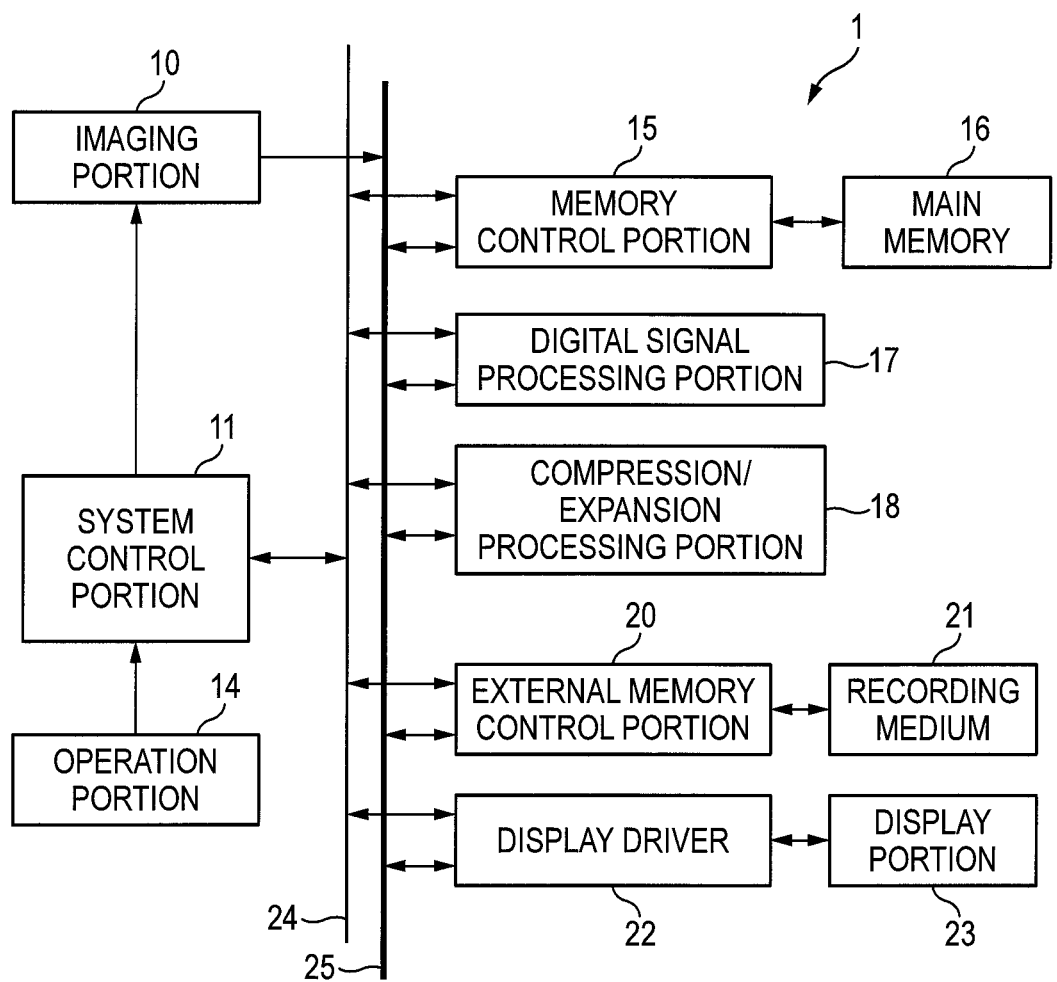
FIG. 1 A diagram schematically showing the configuration of an imaging apparatus for explaining one embodiment of the invention.

FIG. 1 is a view schematically showing the configuration of an imaging apparatus for explaining one embodiment of the invention. Examples of the imaging apparatus include imaging apparatuses such as a digital camera and a digital video camera, an imaging module mounted in a camera-including cell phone, etc. A digital camera will be described here as the imaging apparatus by way of example.

The digital camera 1 shown in the drawing has an imaging portion 10, a system control portion 11, an operation portion 14, a memory control portion 15, a main memory 16, a digital signal processing portion 17, a compression/expansion processing portion 18, an external memory control portion 20, a display driver 22 and a display portion (display device) 23. The system control portion 11 is mainly constituted by a CPU (Central Processing Unit; computer). The operation portion 14 is provided for inputting an instruction signal from a user to the system control portion 11. A detachable recording medium 21 is connected to the external memory control portion 20.

The imaging portion 10 can obtain two photographic image signals with a parallax. For example, an imaging portion which is provided with two imaging elements disposed at a distance from each other and imaging optical systems provided in stages in front of the two imaging elements respectively so that the imaging portion can obtain two photographic image signals with a parallax from the two imaging elements by one shot may be used as the imaging portion 10. Alternatively, an imaging portion which is provided with one imaging element and one imaging optical system provided in a stage in front of the imaging element so that the imaging portion can obtain two photographic image signals with a parallax from the one imaging element by a plurality of shots which are performed while the imaging element and the imaging optical system are moved relatively to each other may be used as the imaging portion 10. The imaging portion 10 operates in accordance with the control of the system control portion 11.

The main memory 16 is used as a work memory so that data can be written into or deleted from the main memory 16 by the control of the memory control portion 15.

The digital signal processing portion 17 performs interpolation operation, gamma correction operation, RGB/YC conversion processing, etc. on the photographic image signals outputted from the imaging portion 10 to thereby generate photographic image data. Two pieces of photographic image data with a parallax generated by the digital signal processing portion 17 (two pieces of photographic image data obtained by imaging from different viewpoints) are associated with each other so as to be generated as stereoscopic image data. For example, the stereoscopic image data are data in an MPO format which conforms to CIPA (Camera & Imaging Products Association) standards.

The compression/expansion processing portion 18 compresses the stereoscopic image data generated by the digital signal processing portion 17 in a JPEG format or expands the compressed image data.

The display portion 23 combines and displays the stereoscopic image data (the two pieces of photographic image data with a parallax) so that the data can be viewed stereoscopically. The display portion 23 is constituted by a liquid crystal display device etc. compatible with a time division parallax image system, a lenticular system, a parallax barrier system, etc. The display portion 23 is driven by the display driver 22.

The memory control portion 15, the digital signal processing portion 17, the compression/expansion processing portion 18, the external memory control portion 20 and the display driver 22 are connected to one another through a control bus 24 and a data bus 25 and controlled by an instruction issued from the system control portion 11.

When an image is taken by the imaging portion 10 in the digital camera 1, stereoscopic image data are generated by the digital signal processing portion 17, and the stereoscopic image data are recorded on the recording medium 21.

When an instruction to reproduce the stereoscopic image data recorded on the recording medium 21 is issued, the display driver 22 makes control to display a stereoscopic image on the display portion 23 based on the stereoscopic image data in accordance with an instruction of the system control portion 11. A cutout mode in which a part of the stereoscopic image can be cut out and displayed and further the cutout area of the stereoscopic image can be scrolled can be set in the digital camera 1. Operation of the digital camera 1 at the time of reproducing the stereoscopic image data will be described below.

Figure 2:
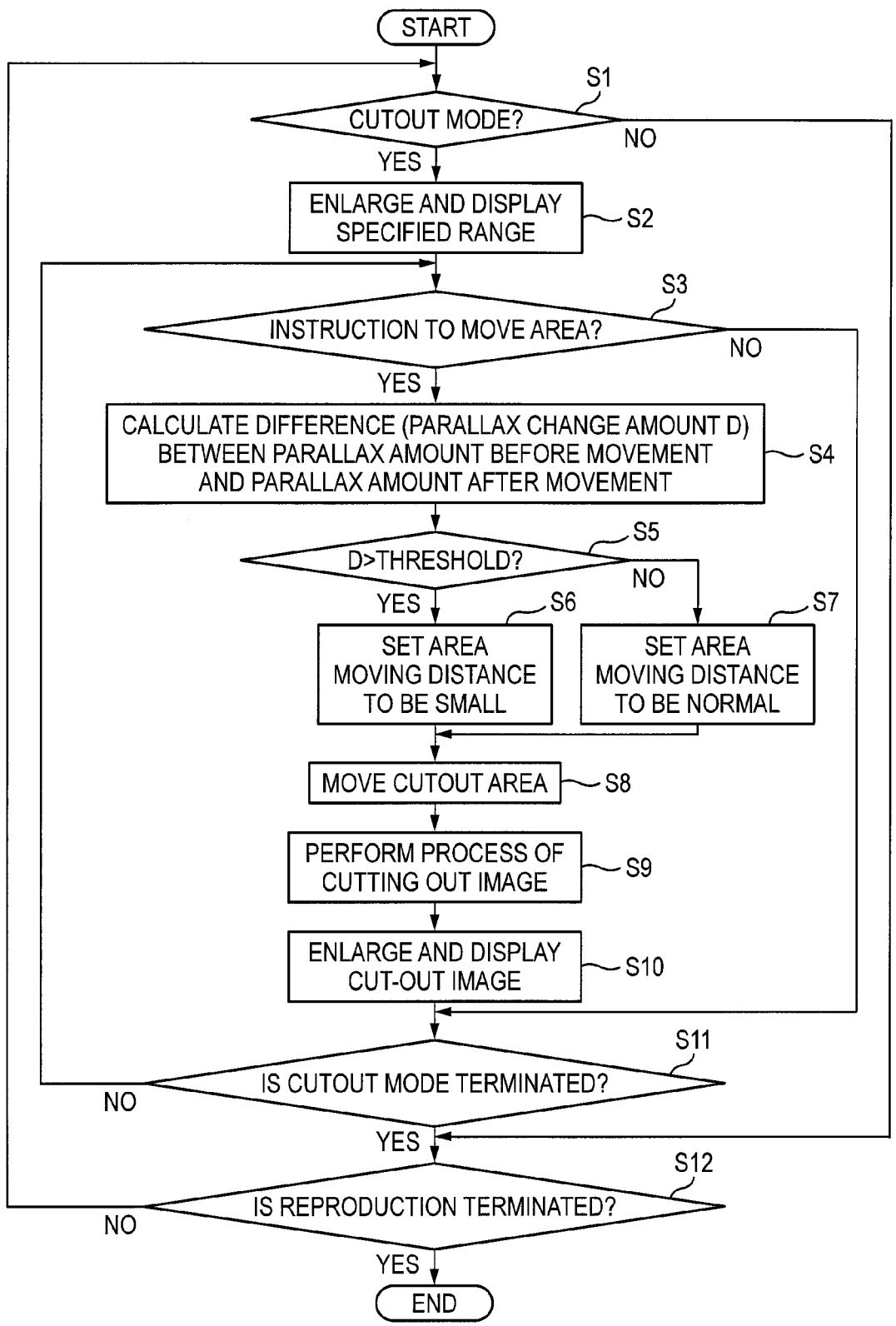
FIG. 2 A flow chart for explaining operation of a digital camera 1 shown in FIG. 1 at the time of reproducing stereoscopic image data.

FIG. 2 is a flow chart for explaining operation of the digital camera 1 shown in FIG. 1 at the time of reproducing stereoscopic image data.

Figure 13:
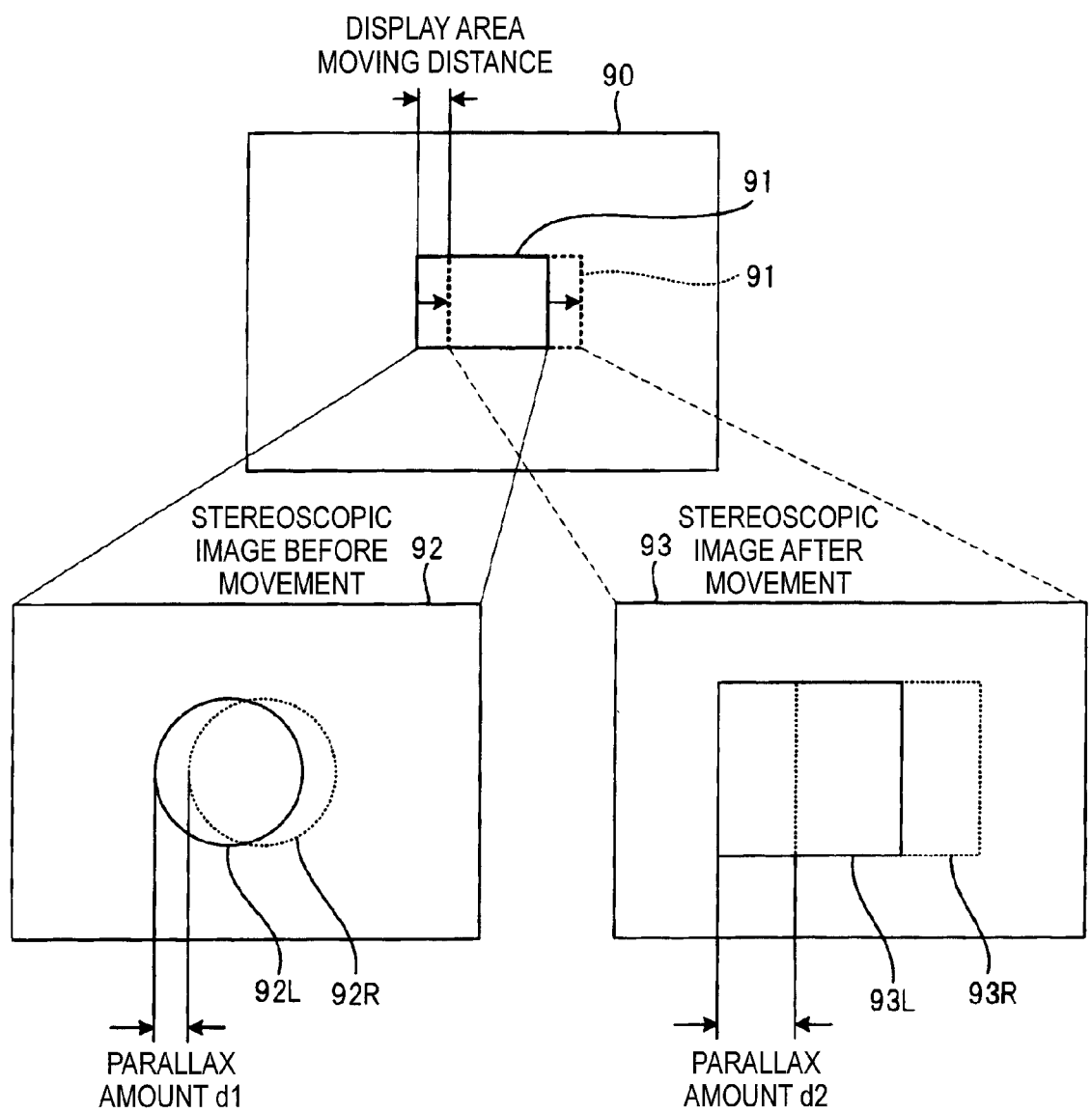
FIG. 13 A view for explaining the change of a parallax amount in a stereoscopic image when the stereoscopic image is enlarged and scrolled.

When the operation portion 14 is operated to set the cutout mode after the stereoscopic image is displayed on the display portion 23 (Step S1: YES), the system control portion 11 makes control so that an area 91 to be cut out can be displayed at a center position of the stereoscopic image 90 which is being displayed on the display portion 23 as shown in FIG. 13 by way of example. When the cutout mode is not set (Step S1: NO), the system control portion 11 in Step S12 determines whether to terminate the reproduction of the stereoscopic image or not. When an instruction to terminate the reproduction is issued, the system control portion 11 terminates the reproduction. When no instruction to terminate the reproduction is issued, the system control portion 11 returns the processing to Step S1.

A user can move the area 91 to be displayed on the display portion 23, desirably by means of cross keys or the like belonging to the operation portion 14. When the user pushes down a decision button belonging to the operation portion 14 after moving the area 91 to a predetermined position, the system control portion 11 cuts out a stereoscopic image within the area 91 so that the cut-out stereoscopic image can be enlarged and displayed in the whole of the display screen of the display portion 23 (Step S2).

After Step S2, the system control portion 11 determines whether there is or not an instruction to move the area 91 (Step S3). When there is no instruction to move the area 91 (Step S3: NO), the system control portion 11 carries out processing of Step S11.

When there is an instruction to move the area 91 (Step S3: YES), the system control portion 11 calculates a change amount D between a parallax amount in a stereoscopic image which is cut out from the area 91 which has not been moved yet and which is displayed on the display portion 23 and a parallax amount in a stereoscopic image which will be cut out from the area 91 and displayed on the display portion 23 after the area 91 is moved by a fixed moving distance (Step S4). The fixed moving distance is a value set in the digital camera 1 in advance.

When, for example, there is an instruction to move the area 91 from the solid-line position to the broken-line position as shown in FIG. 13, the system control portion 11 calculates a change amount D between a parallax amount in a stereoscopic image 92 cut out from the area 91 and enlarged and displayed in the whole of the display surface of the display portion 23 when the area 91 is located in the solid-line position and a parallax amount in a stereoscopic image 93 cut out from the area 91 and enlarged and displayed in the whole of the display surface of the display portion 23 when the area 91 is located in the broken-line position.

Examples of the method for calculating a parallax amount in the stereoscopic image 92 or 93 may include the following four.

1. A parallax amount in a primary subject contained in the stereoscopic image 92 (93) (for example, of subjects extracted from the stereoscopic image 92 (93), a subject having the largest size, a subject at the center of the stereoscopic image 92 (93), etc.) is set as the parallax amount in the stereoscopic image.

2. Of parallax amounts of subjects contained in the stereoscopic image 92 (93), a parallax amount having the largest value is set as the parallax amount in the stereoscopic image.

3. A histogram of parallax amounts of subjects contained in the stereoscopic image 92 (93) is generated, and a parallax amount most frequent in terms of number in the histogram is set as the parallax amount in the stereoscopic image.

4. An average value of parallax amounts of subjects contained in the stereoscopic image 92 (93) is set as the parallax amount in the stereoscopic image.

For example, as shown in FIG. 13, the parallax amount of the stereoscopic image 92 corresponds to a parallax amount d1 between a subject 92L and a subject 92R, and the parallax amount of the stereoscopic image 93 corresponds to a parallax amount d2 between a subject 93L and a subject 93R. The change amount D can be expressed by |d1−d2|.

Each subject belonging to a stereoscopic image appears to be on a screen of a display portion in a site where the parallax amount is zero, and appears to be protruded from or recessed into the screen as the parallax amount increases. When signs (positive and negative) of parallax amounts on the protruded side and on the recessed side are regarded as reverse to each other, for example, the maximum value of the absolute value of the parallax amount in the subject on one of the protruded side and the recessed side, the maximum value of the absolute value of the parallax amount in the subject on the both sides, or the like, may be used as the parallax amount having the largest value in the calculation method of the aforementioned paragraph (2).

In addition, for example, the average value of the parallax amount in the subject on one of the protruded side and the recessed side, the average value of the absolute value of the parallax amount in the subject on both the sides, or the like, may be set as the average value in the calculation method of the aforementioned paragraph (4).

A sense of fatigue may be given to the user when there is a large parallax change (corresponding to the aforementioned change amount D) between the stereoscopic image 93 cut out from the area 91 and displayed after the area 91 is moved by the fixed moving distance and the stereoscopic image 92 cut out from the area 91 and displayed before the area 91 is moved.

Therefore, the system control portion 11 compares the change amount D with a threshold after Step S4. When the change amount D exceeds the threshold (Step S5: YES), the system control portion 11 sets the moving distance of the area 91 to be moved in accordance with a movement instruction, at a value which is smaller than the fixed moving distance (a predetermined value which is, for example, half as large as the fixed moving distance) (Step S6). On the other hand, when the change amount D is not larger than the threshold (Step S5: NO), the system control portion 11 sets the moving distance of the area 91 to be moved in accordance with a movement instruction, at the fixed moving distance (Step S7).

After Step S6 or S7, the system control portion 11 moves the area 91 by the moving distance set in Step S6 or S7 (Step S8), cuts out a stereoscopic image within the area 91 after the movement (Step S9), and enlarges and displays the cut-out stereoscopic image in the whole of the display surface of the display portion 23 (Step S10). After Step S10, the system control portion 11 determines whether to terminate the cutout mode or not in Step S11. When there is an instruction to terminate the cutout mode, the system control portion 11 terminates the cutout mode to perform processing of Step S12. When there is no instruction to terminate the cutout mode, the system control portion 11 returns the processing to Step S3.

In the aforementioned manner, according to the digital camera 1, when a part of a stereoscopic image is cut out and displayed, the cut-out area is moved by a moving distance smaller than the fixed moving distance in the case where the parallax amount in the stereoscopic image cut out and displayed varies largely between before and after the movement of the cut-out area. It is therefore possible to suppress a sudden change in parallax during the scroll of the stereoscopic image, so that it is possible to reduce the sense of fatigue given to the user.

Although the system control portion 11 displays a stereoscopic image on the display portion 23 in the digital camera 1, the invention is not limited to this manner. For example, the digital camera 1 may be connected to an external display device so that a stereoscopic image can be displayed on the display device. In this case, the same processes as those shown in FIG. 2 are carried out, except that the display driver to be controlled by the system control portion 11 is not the display driver 22 but is replaced by a driver mounted on the external display device.

In addition, the moving distance of the area 91 set by the system control portion 11 in Step S6 of FIG. 2 is not limited to a predetermined value. Description will be made below about a modification of the method for setting the moving distance in Step S6.

Figure 3:
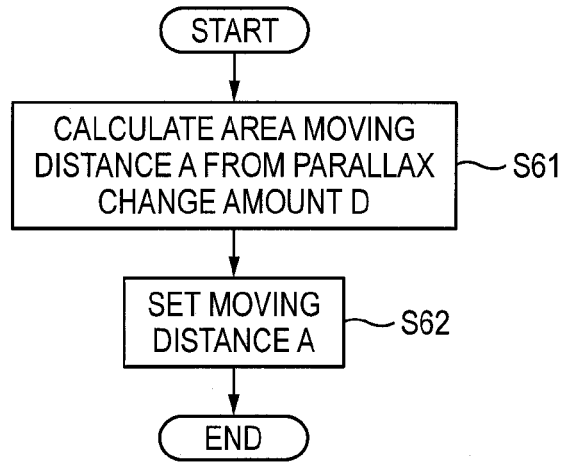
FIG. 3 A flow chart for explaining a modification of a step S6 shown in FIG. 2.

FIG. 3 is a flow chart for explaining a modification of Step S6 shown in FIG. 2.

When the change amount D exceeds the threshold (Step S5 in FIG. 2: YES), the system control portion 11 calculates a moving distance A of the area 91 based on the change amount D (Step S61), and sets the moving distance A as the moving distance of the area 91 to be moved in accordance with a movement instruction (Step S62). After Step S62, processing on and after Step S8 in FIG. 2 is carried out.

The moving distance A can be, for example, calculated in the following Expression (1) where Mf designates the fixed moving distance and Mmax designates the maximum value of the parallax amount allowable as stereoscopic vision.

$$A = Mf \times \{(M\text{max} - D)/M\text{max}\} \quad (1)$$

In this manner, the moving distance A is calculated based on the change amount D, and the area 91 is moved by the moving distance A, so that the area can be moved by the moving distance in accordance with the parallax change between before and after the movement of the area 91. Thus, the sense of fatigue given to the user can be reduced effectively.

Figure 4:
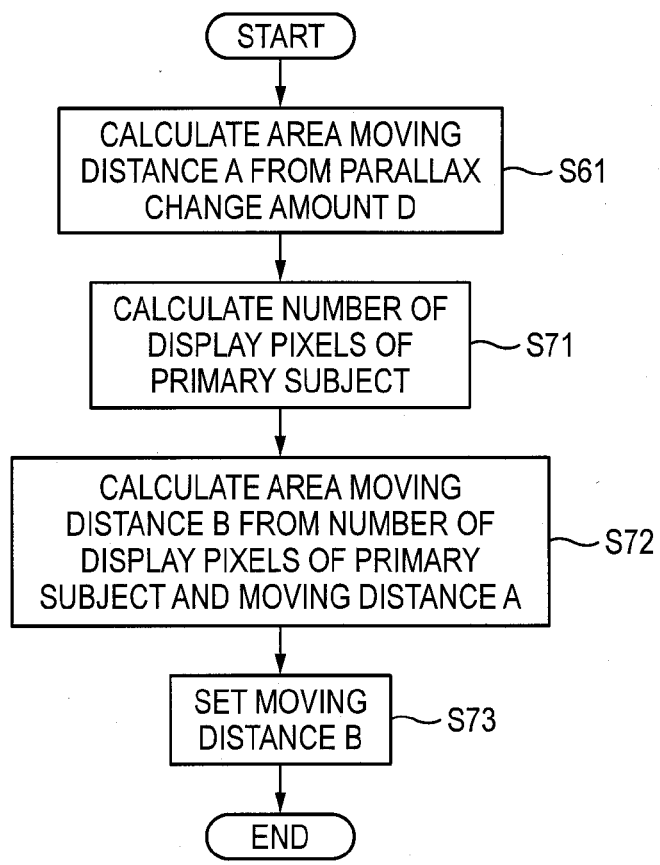
FIG. 4 A flow chart for explaining a modification of the step S6 shown in FIG. 2.

FIG. 4 is a flow chart for explaining another modification of Step S6 shown in FIG. 2.

When the change amount D exceeds the threshold (Step S5 in FIG. 2: YES), the system control portion 11 carries out the same processing as in Step S61 of FIG. 3, so as to calculate the moving distance A. After that, the system control portion 11 obtains the display size (the number of display pixels) of a primary subject contained in the stereoscopic image which is being enlarged and displayed on the display portion 23 (Step S71). The display size of the primary subject means the number of display pixels constituting the primary subject displayed on the display portion 23. A subject at the center of the displayed stereoscopic image, a predetermined subject (e.g. a face), etc. may be set in advance as the primary subject.

Next, the system control portion 11 corrects the moving distance A calculated in Step S61, based on the display size of the primary subject obtained in Step S71, so as to calculate a final moving distance B (Step S72). The system control portion 11 sets the final moving distance B as the moving distance of the area 91 to be moved in accordance with a movement instruction (Step S73). After Step S73, processing on and after Step S8 in FIG. 2 is carried out.

The moving distance B can be, for example, calculated in the following Expression (2) where Th1 designates a threshold for the number of pixels and P designates the display size of the primary subject.

$$B = A \times \alpha, \alpha = Th1/(P - Th1) \quad (2)$$

where $0 \leq \alpha \leq 1$

In this manner, according to the modification, the system control portion 11 calculates the moving distance B in consideration of not only the change amount D but also the display size (the number of display pixels) of the primary subject in the stereoscopic image cut out from the area 91 before the movement and displayed. When the primary subject enlarged and displayed on the display portion 23 has a large size, the sense of fatigue given to the user is apt to increase due to the movement of the area 91. When the moving distance B is calculated according to the aforementioned Expression (2), the moving distance B can be adjusted in accordance with the size of the primary subject enlarged and displayed on the display portion 23. Thus, optimum control can be made in consideration of the size of the primary subject displayed on the display portion 23.

Figure 5:
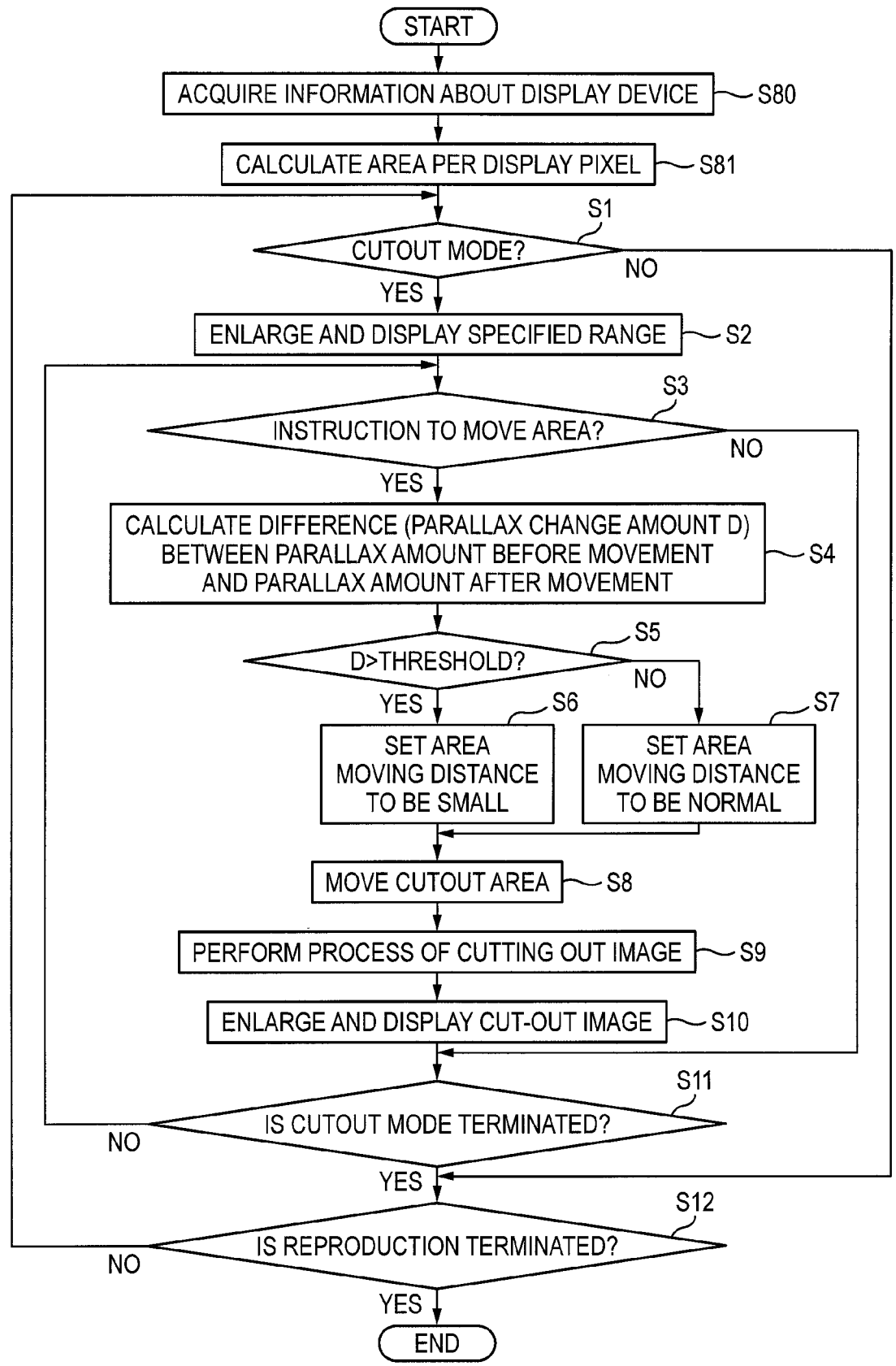
FIG. 5 A flow chart for explaining a first modification of operation of the digital camera 1 shown in FIG. 1 at the time of reproducing a stereoscopic image.
Figure 6:
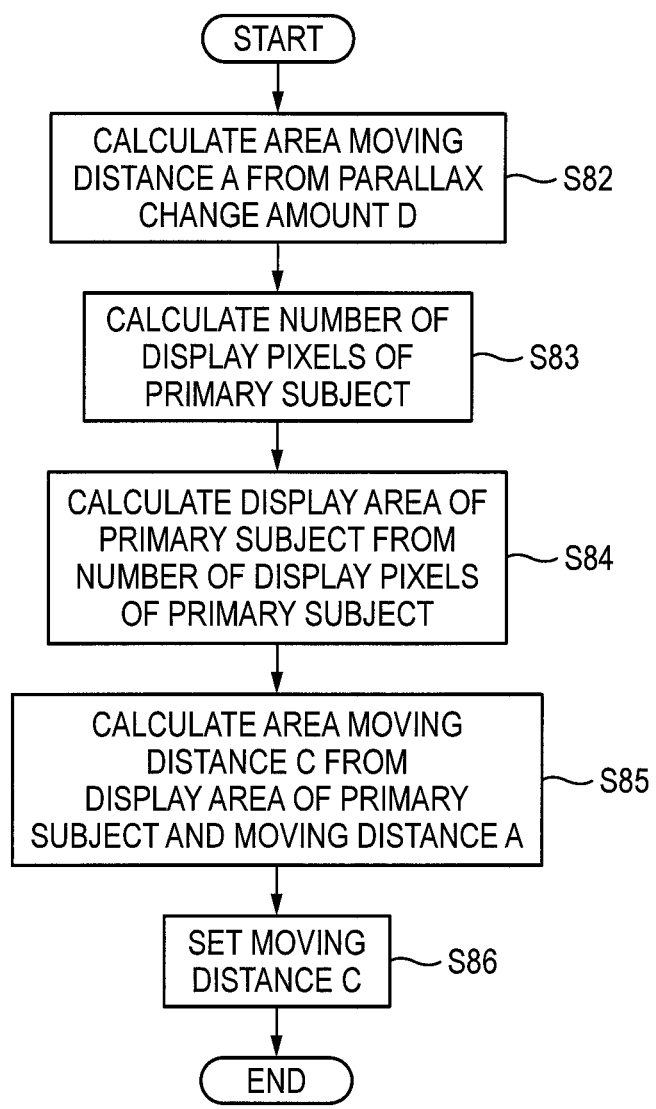
FIG. 6 A flow chart for explaining the details of the step S6 in FIG. 5.

FIG. 5 is a flow chart for explaining a modification of operation of the digital camera 1 shown in FIG. 1 at the time of reproducing a stereoscopic image. The details of Step S6 shown in FIG. 5 are shown in FIG. 6. In FIG. 5, the same processes as those shown in FIG. 2 are referred to by the same numerals correspondingly and description thereof will be omitted. A digital camera which is connected an external display device (e.g. a large-screen television set) so that a stereoscopic image can be displayed on the display device is assumed as the digital camera 1 carrying out the operation shown in FIG. 5.

Before the processing of Step S1, the system control portion 11 acquires information about the display size and the display area (the area depending on "vertical length"×"horizontal length" of the surface where the image is displayed) of the display device (the display portion 23 or the external display device connected to the digital camera 1) on which a stereoscopic image will be displayed (Step S80), and calculates an area per display pixel of the display device from the information (Step S81). After Step S81, the system control portion 11 carries out processing on and after Step S1.

When the determination of Step S5 is YES, the system control portion 11 carries out the same processing as in Step S61 of FIG. 3, so as to calculate the moving distance A (Step S82).

Next, the system control portion 11 carries out the same processing as in Step S71 of FIG. 4, so as to calculate the display size (the number of display pixels) of a primary subject (Step S83).

Next, the system control portion 11 multiplies the display size (the number of display pixels) of the primary subject calculated in Step S83 by the area per display pixel calculated in Step S81, so as to calculate the display area of the primary subject displayed on the display portion 23 or the external display device (Step S84).

Next, the system control portion 11 corrects the moving distance A calculated in Step S82 based on the display area of the primary subject calculated in Step S84 so as to calculate a moving distance C (Step S85).

Next, the system control portion 11 sets the moving distance C as the moving distance of the area 91 to be moved in accordance with a movement instruction (Step S86). After Step S86, processing on and after Step S8 in FIG. 5 is carried out.

The moving distance C can be, for example, calculated in the following Expression (3) where Th2 designates a surface area threshold and S designates the display area of the primary subject.

$$C = A \times \beta, \beta = Th2/(S-Th2) \quad (3)$$

where $0 \leq \beta \leq 1$

In this manner, according to the modification, the system control portion 11 calculates the moving distance C in consideration of not only the change amount D but also the display area of the primary subject contained in the stereoscopic image enlarged and displayed on the display device before the movement of the area. Even when the display size of the primary subject is large, the ratio of the display area of the primary subject to the display area of the display device is reduced as long as the display device has a large display size. Thus, the sense of fatigue given to the user is hardly increased. When the moving distance C is calculated according to the aforementioned Expression (3), the moving distance C can be adjusted in accordance with the display area of the display device in spite of the large display size of the primary subject. Thus, optimum control can be made in consideration of the display area of the display device on which the stereoscopic image is displayed.

Figure 7:
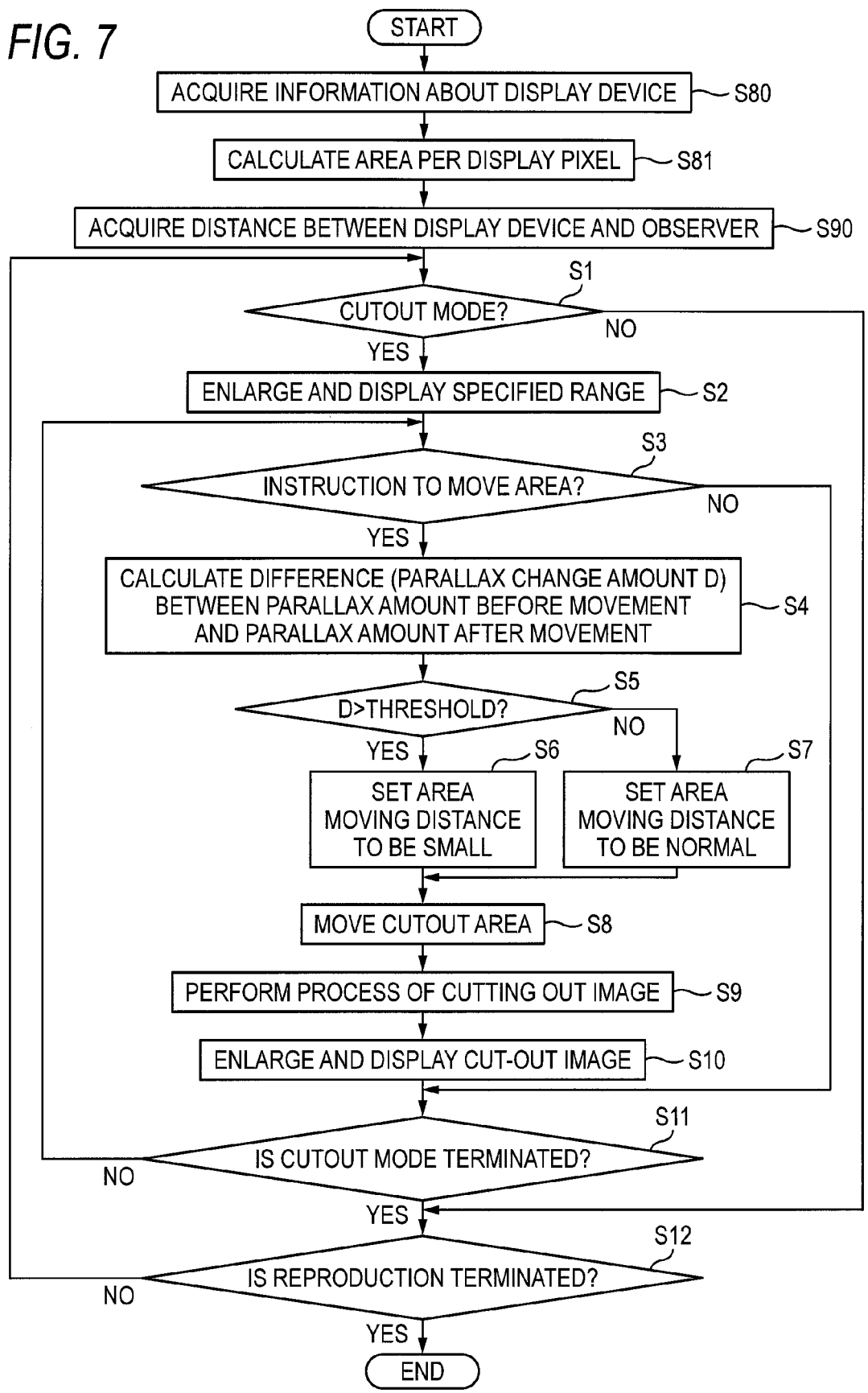
FIG. 7 A flow chart for explaining a second modification of operation of the camera 1 shown in FIG. 1 at the time of reproducing a stereoscopic image.
Figure 8:
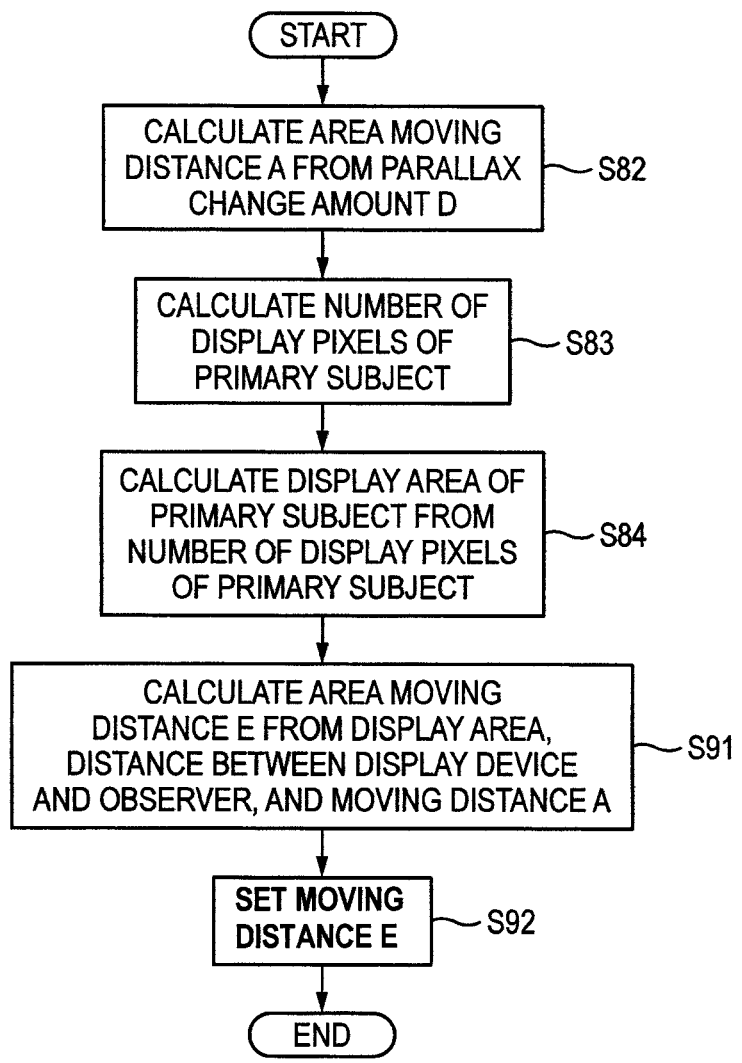
FIG. 8 A flow chart for explaining the details of a step S6 in FIG. 7.

FIG. 7 is a flow chart for explaining a modification of the operation shown in FIG. 5. The details of Step S6 shown in FIG. 7 are shown in FIG. 8. In FIG. 7, the same processes as those shown in FIG. 5 are referred to by the same numerals correspondingly and description thereof will be omitted. In addition, in FIG. 8, the same processes as those shown in FIG. 6 are referred to by the same numerals correspondingly and description thereof will be omitted.

After Step S81, the system control portion 11 acquires information about a distance between the display device on which a stereoscopic image is displayed (the display portion 23 or the external display device connected to the digital camera 1) and the observer (user) who is observing the display device (Step S90). After Step S90, the system control portion 11 carries out processing on and after Step S1.

As for the information about the distance acquired by the system control portion 11 in Step S90, for example, information about the distance can be inputted from the operation portion 14 of the digital camera 1 so that the system control portion 11 can acquire the information about the distance inputted by the user.

When the determination of Step S5 in FIG. 7 is YES, the system control portion 11 carries out the same processing as in Step S82 to Step S84 of FIG. 6.

After Step S84, the system control portion 11 corrects the moving distance A calculated in Step S82 based on the display area of the primary subject calculated in Step S84 and the information about the distance acquired in Step S90 so as to calculate a moving distance E (Step S91).

Next, the system control portion 11 sets the moving distance E as the moving distance of the area 91 to be moved in accordance with a movement instruction (Step S92). After Step S92, processing on and after Step S8 in FIG. 5 is carried out.

The moving distance E can be, for example, calculated in the following Expression (4) where Th3 designates a surface area threshold, Th4 designates a display device to user distance threshold, S designates the display area of the primary subject, and d designates the display device to user distance.

$$E = A \times \gamma \times \theta, \gamma = Th3/(S-Th3), \theta = Th4/(d-Th4) \quad (4)$$

where $0 \leq \gamma \leq 1$ and $0 \leq \theta \leq 1$

In this manner, according to the modification, the system control portion 11 calculates the moving distance E in consideration of not only the change amount D but also the display area of the primary subject contained in the stereoscopic image enlarged and displayed on the display device before the movement of the area, and the distance between the display device and the user who is observing it. Even when the ratio of the display area of the primary subject to the display area of the display device is large, the primary subject looks small as long as the user is observing the display device at a long distance therefrom. Thus, the sense of fatigue given to the user is hardly increased. When the moving distance E is calculated according to the aforementioned Expression (4), the moving distance E can be adjusted in accordance with the distance between the display device and the observer in spite of the large ratio of the display area of the primary subject to the display area of the display device. Thus, optimum control can be made in consideration of the observation situation of the stereoscopic image.

Figure 9:
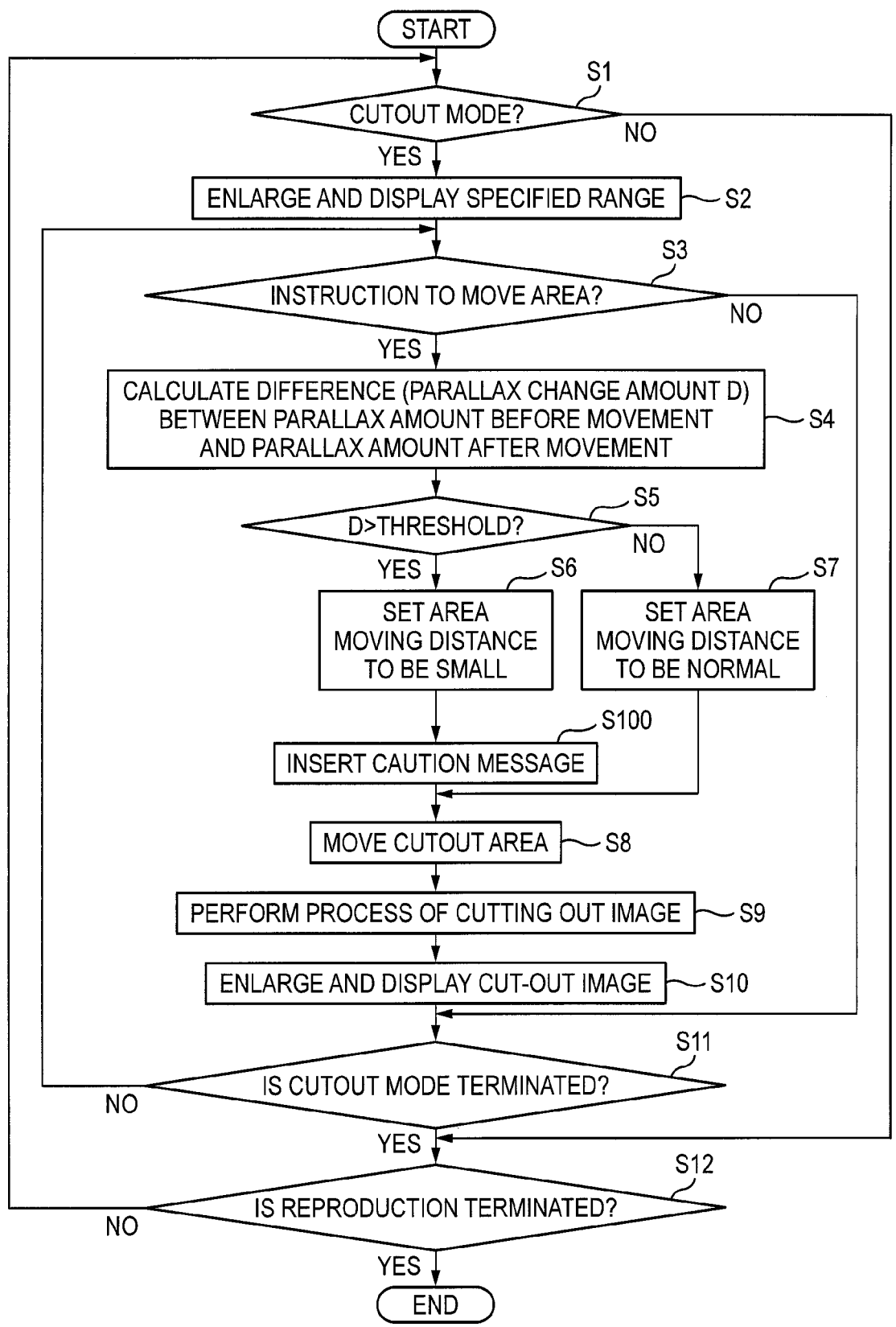
FIG. 9 A flow chart for explaining a third modification of operation of the digital camera 1 shown in FIG. 1 at the time of reproducing a stereoscopic image.

FIG. 9 is a flow chart for explaining a third modification of operation of the digital camera 1 shown in FIG. 1 at the time of reproducing a stereoscopic image. In FIG. 9, the same processes as those shown in FIG. 2 are referred to by the same numerals correspondingly and description thereof will be omitted. In the flow chart shown in FIG. 9, Step S100 is added between Step S6 and Step S8 in FIG. 2.

In Step S100, the system control portion 11 displays a caution message at a desired position of the display portion 23 in order to inform the user of the fact that the moving distance of the area 91 has been made smaller than the fixed moving distance. For example, a message "Scroll speed has been lowered to reduce the fatigue of Your eyes" may be displayed as the caution message.

When the moving distance of the area 91 is set to decrease in this manner, a sense of discomfort caused by the sudden change of the scroll speed can be reduced by the caution message displayed on the display portion 23.

Figure 10:
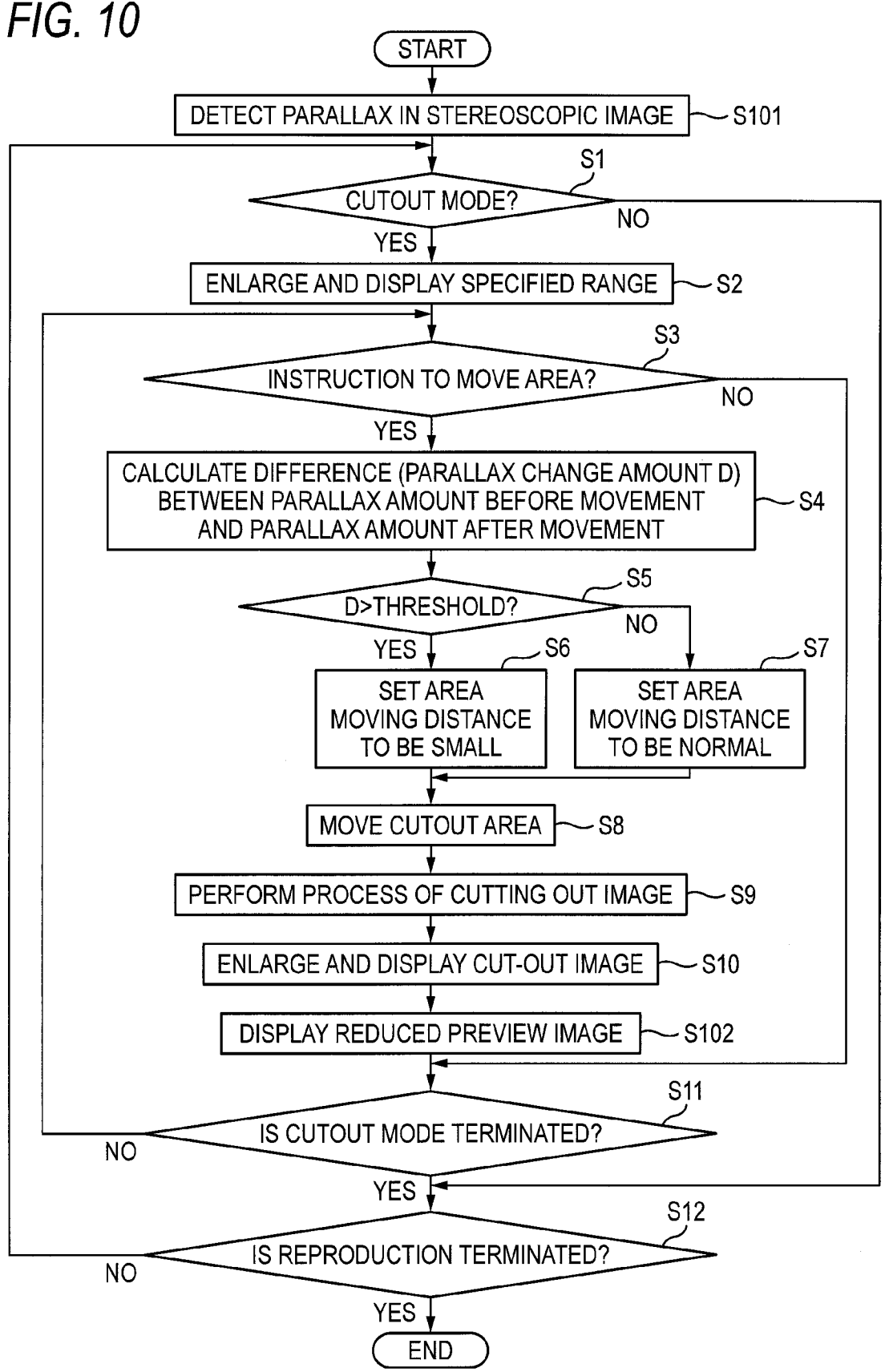
FIG. 10 A flow chart for explaining a fourth modification of operation of the digital camera 1 shown in FIG. 1 at the time of reproducing a stereoscopic image.

FIG. 10 is a flow chart for explaining a modification of operation of the digital camera 1 shown in FIG. 1 at the time of reproducing a stereoscopic image. In FIG. 10, the same processes as those shown in FIG. 2 are referred to by the same numerals correspondingly and description thereof will be omitted. In the flow chart shown in FIG. 10, Step S101 is added before Step S1 and Step S102 is further added between Step S10 and Step S11 in FIG. 2.

In Step S101, the system control portion 11 obtains a parallax amount of each subject contained in a stereoscopic image (a stereoscopic image 90 shown in FIG. 13) displayed on the display portion 23.

Figure 11:
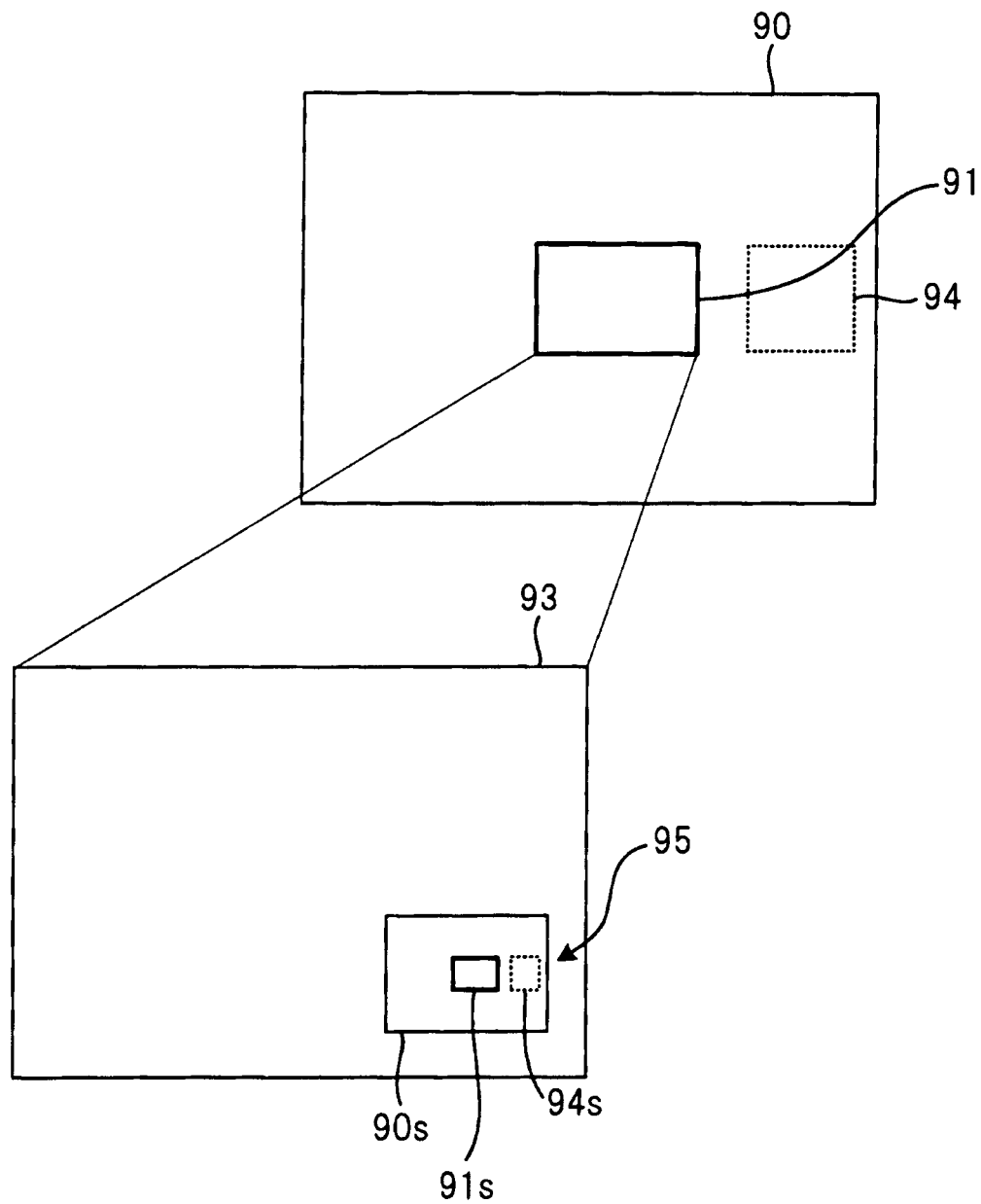
FIG. 11 A view showing an example of an image displayed in a step S102 in FIG. 10.

In Step S102, the system control portion 11 displays a reduced preview image 95, as illustrated in FIG. 11 by way of example, so as to be superimposed on a stereoscopic image 93 enlarged and displayed. The reduced preview image 95 does not have to be superimposed on the stereoscopic image 93 as long as the reduced preview image 95 and the stereoscopic image 93 can be confirmed at the same time.

The reduced preview image 95 consists of an image 90s in which the stereoscopic image 90 has been reduced, a frame image 91s in which the area 91 set for the stereoscopic image 90 has been reduced, and a frame image 94s.

When the area 91 moves into that area by the fixed moving distance based on the parallax amount of each subject contained in the stereoscopic image 90 and obtained in Step S101, the system control portion 11 calculates a region where the aforementioned change amount D exceeds the threshold before and after the movement (for example, a region 94 in FIG. 11), and displays the frame image 94s as a frame indicating the region 94 on the display portion 23. For example, a parallax amount within the area 91 and in each moving position of the area 91 is calculated when the area 91 is moved entirely by the fixed moving distance, so that the region 94 can be obtained from a distribution of the difference in parallax amount between adjacent ones of the moving positions.

As shown in FIG. 11, the reduced preview image 95 is displayed on the display portion 23 together with the stereoscopic image 93 cut out and displayed, so that the user can know whether the moving distance of the area 91 will be reduced or not when the area 91 is moved to a place. It is therefore possible to reduce the sense of discomfort caused by the sudden change of the scroll speed.

Figure 12:
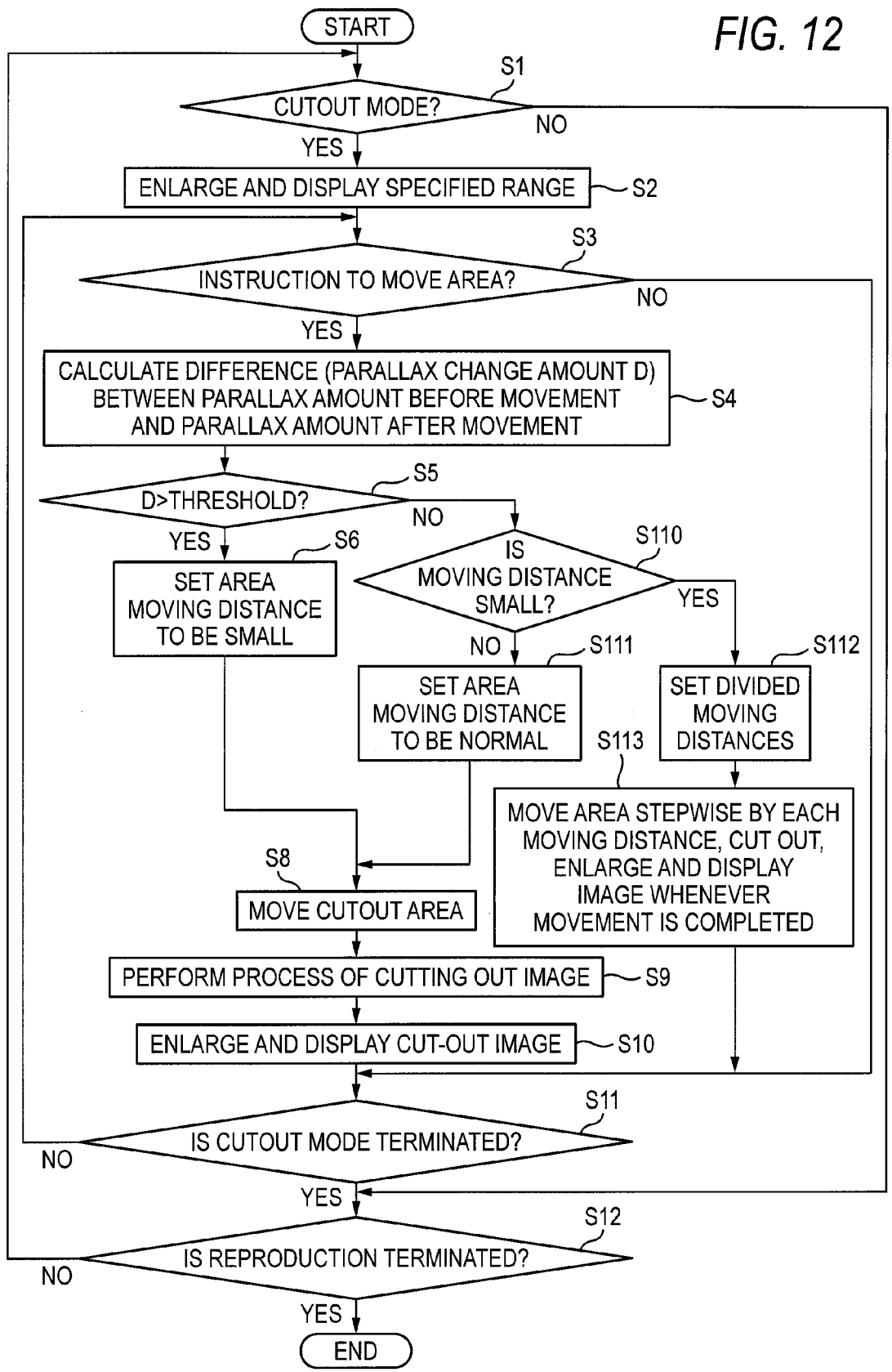
FIG. 12 A flow chart for explaining a fifth modification of operation of the digital camera 1 shown in FIG. 1 at the time of reproducing a stereoscopic image.

FIG. 12 is a flow chart for explaining a modification of operation of the digital camera 1 shown in FIG. 1 at the time of reproducing a stereoscopic image. In FIG. 12, the same processes as those shown in FIG. 2 are referred to by the same numerals correspondingly and description thereof will be omitted. In the flow chart shown in FIG. 12, Step S7 is replaced by Step S110 to S113 in FIG. 2.

In Step S110, the system control portion 11 determines whether the moving distance of the area 91 has been set at a value smaller than the fixed moving distance or not.

When the moving distance of the area 91 has been set at a value smaller than the fixed moving distance (Step S110: YES), the system control portion 11 sets the moving distance divided into a plurality of moving distances the total of which corresponds to the fixed moving distance (Step S112).

In Step S112, for example, the system control portion 11 sets each moving distance F(x) obtained in the following Expression (5) where M designates the moving distance set in Step S6 of FIG. 12 and t designates the number of times of movement of the area 91 until the area 91 moves by the fixed moving distance Mf (t is a natural number not lower than 2).

$$F(x)=Mf-(Mf-M)\times(t-x)/t \quad (5)$$

where x can take a value of any natural number not higher than t.

After that, the system control portion 11 moves the area 91 stepwise by the moving distance F(x) set in Step S112 while cutting out a stereoscopic image in each moving position of the area 91 so as to enlarge and display the cut-out stereoscopic image on the display portion 23 (Step S113). After that, processing on and after Step S11 is carried out.

When, for example, t=2 in Expression (5), the system control portion 11 moves the area 91 by the moving distance F(1) and then cuts out a stereoscopic image in the area 91 so as to enlarge and display the cut-out stereoscopic image on the display portion 23. After that, the system control portion 11 moves the area 91 by the moving distance {F(2)−F(1)} and cutting out a stereoscopic image in the area 91 so as to enlarge and display the cut-out stereoscopic image on the display portion 23. Thus, the final moving distance of the area 91 reaches Mf.

When the determination in Step S110 is NO, the system control portion 11 sets the moving distance of the area 91 as the fixed moving distance (Step S111), and then carries out processing on and after Step S8.

When the change amount D is not higher than the threshold in the state where the moving distance of the area 91 has been set at a value smaller than the fixed moving distance, the area 91 is not moved by the fixed moving distance at one time of movement but is moved by the fixed moving distance at a plurality of times of movement, so that the sense of discomfort caused by the sudden change of the scroll speed can be reduced.

The embodiments which have been described so far may be combined suitably. For example, any modification described in FIG. 9 to FIG. 12 may be combined with any modification described in FIG. 5 and FIG. 7. In addition, any modification described in FIG. 9 or FIG. 10 may be combined with the modification described in FIG. 12.

In addition, although a digital camera has been taken as an example in each embodiment, the technique described in the embodiment may be applied to any electronic equipment (e.g. a television set etc. compatible with 3D display) mounted with a display control device for making control to reproduce and display stereoscopic image data on a display portion. In such an electronic equipment, a CPU (computer) mounted on the electronic equipment may perform each step of the flow chart shown in FIG. 2 to FIG. 10 and FIG. 12 so that a burden imposed on a user who observes the display portion can be reduced.

In addition, the description has been made so far on the assumption that the size of the stereoscopic image 90 reproduced and displayed is equal to the display size of the display portion 23 or the external display device, or the stereoscopic image 90 is reduced in advance to be accommodated in the display size of the display portion 23 or the external display device. Apart from the assumption, however, even when the size of the stereoscopic image 90 is larger than the display size of the display portion 23 or the external display device, for example, even when the size of the stereoscopic image within the area 91 is equal to the display size of the display portion 23 or the external display device in FIG. 13, the system control portion 11 may carry out the processes described in FIG. 2 to FIG. 8 in response to an instruction to move the area 91, so that the sense of fatigue given to the user who is viewing stereoscopically can be reduced.

As described above, the following items are disclosed herein.

The apparatus for controlling display of a stereoscopic image disclosed herein includes: a display control portion which cuts out a stereoscopic image in a to-be-displayed area which is an area corresponding to a part of a stereoscopic image consisting of a plurality of images with a parallax, and displays the cut-out stereoscopic image on a display portion; a parallax change amount calculation portion which calculates a change amount between a parallax amount in a stereoscopic image within the to-be-displayed area before the to-be-displayed area is moved and a parallax amount in a stereoscopic image within the to-be-displayed area after the to-be-displayed area is moved by a first moving distance when an instruction to move the to-be-displayed area is issued; and a to-be-displayed area movement control portion which moves the to-be-displayed area by a moving distance in accordance with the change amount calculated by the parallax change amount calculation portion.

The apparatus for controlling display of a stereoscopic image disclosed herein further includes: a moving distance setting portion which sets a second moving distance smaller than the first moving distance as the moving distance by which the to-be-displayed area is moved in accordance with the instruction when the change amount is larger than a threshold and which sets the first moving distance as the moving distance by which the to-be-displayed area is moved in accordance with the instruction when the change amount is not larger than the threshold; wherein the to-be-displayed area movement control portion moves the to-be-displayed area by the moving distance set by the moving distance setting portion.

The apparatus for controlling display of a stereoscopic image disclosed herein further includes: a moving distance generating portion which obtains the second moving distance based on at least the change amount.

The apparatus for controlling display of a stereoscopic image disclosed herein further includes: a primary subject detection portion which detects a primary subject contained in the stereoscopic image; and a subject display pixel number calculation portion which obtains the number of display pixels of the primary subject contained in the stereoscopic image within the to-be-displayed area before movement; wherein the moving distance generating portion obtains the second moving distance based on the change amount and the number of display pixels of the primary subject.

The apparatus for controlling display of a stereoscopic image disclosed herein further includes: a display portion information acquisition portion which acquires information about a display area and the number of display pixels of the display portion; and a subject display area calculation portion which obtains a display area of the primary subject on the display portion based on the number of display pixels of the primary subject calculated by the subject display pixel number calculation portion and the information about the display area and the number of display pixels of the display portion; wherein the moving distance generating portion obtains the second moving distance based on the change amount and the display area of the primary subject.

The apparatus for controlling display of a stereoscopic image disclosed herein further includes: a distance information acquisition portion which obtains information about a distance between the display portion and an observer who observes the display portion; wherein the moving distance generating portion obtains the second moving distance based on the change amount, the display area of the primary subject, and the distance.

The apparatus for controlling display of a stereoscopic image disclosed herein further includes: a moving distance setting information display control portion which displays, on the display portion, information which makes it possible to identify a fact that the moving distance of the to-be-displayed area to be moved in accordance with the instruction has been set at the second moving distance when the moving distance has been set at the second moving distance.

The apparatus for controlling display of a stereoscopic image disclosed herein further includes: a parallax amount calculation portion which obtains parallax amounts of subjects in the whole of the stereoscopic image consisting of the plurality of images with the parallax; a region calculation portion which obtains a region where, when the to-be-displayed area moves into the region by the first moving distance, the change amount between before and after the movement of the to-be-displayed area will exceed the threshold, based on the parallax amounts obtained by the parallax amount calculation portion; and a region image display control portion which displays an image indicating the region obtained by the region calculation portion, on the display portion together with the stereoscopic image which is being displayed on the display portion.

In the apparatus for controlling display of a stereoscopic image disclosed herein, when the change amount is not higher than the threshold in a state where the moving distance of the to-be-displayed area to be moved in accordance with the instruction has been set at the second moving distance, the moving distance setting portion sets the moving distance of the to-be-displayed area to be moved in accordance with the instruction, into a plurality of moving distances the total of which corresponds the first moving distance; and the to-be-displayed area movement control portion moves the to-be-displayed area stepwise by the plurality of moving distances when the plurality of moving distances are set.

In the apparatus for controlling display of a stereoscopic image disclosed herein, the parallax change amount calculation portion which sets a parallax amount in the stereoscopic image within the to-be-displayed area as one of a parallax amount of a primary subject contained in the to-be-displayed area, a maximum value of parallax amounts of subjects contained in the to-be-displayed area, a peak value of a histogram of parallax amounts of subjects contained in the to-be-displayed area, and an average value of parallax amounts of subjects contained in the to-be-displayed area.

The method for controlling display of a stereoscopic image disclosed herein includes: a display control step of cutting out a stereoscopic image in a to-be-displayed area which is an area corresponding to a part of a stereoscopic image consisting of a plurality of images with a parallax, and displaying the cut-out stereoscopic image on a display portion; a parallax change amount calculation step of calculating a change amount between a parallax amount in a stereoscopic image within the to-be-displayed area before the to-be-displayed area is moved and a parallax amount in a stereoscopic image within the to-be-displayed area after the to-be-displayed area is moved by a first moving distance when an instruction to move the to-be-displayed area is issued; and a to-be-displayed area movement control step of moving the to-be-displayed area by a moving distance in accordance with the change amount calculated in the parallax change amount calculation step.

The imaging apparatus disclosed herein includes: the apparatus for controlling display of a stereoscopic image; the display portion; an imaging portion which images subjects; and an image processing portion which generates stereoscopic image data for displaying the stereoscopic image, from a plurality of photographic image signals obtained by photographing with the imaging portion.

INDUSTRIAL APPLICABILITY

According to the invention, it is possible to provide a method for controlling display of a stereoscopic image and an apparatus for controlling display of a stereoscopic image which can reduce a sense of fatigue given to an observer when a stereoscopic image is scrolled and displayed, and an imaging apparatus provided with the method or apparatus for controlling display of a stereoscopic image.

Although the invention has been described in detail and with reference to its specific embodiments, it is obvious for those skilled in the art that various changes or modifications can be made without departing from the spirit and scope of the invention.

The present application is based on a Japanese patent application (Japanese Patent Application No. 2011-215646) filed on Sep. 29, 2011, the contents of which are incorporated herein by reference.

REFERENCE SIGNS LIST 1 digital camera
11 system control portion
23 display portion
90 stereoscopic image
91 area to be cut out
92, 93 stereoscopic image cut out and displayed

The invention claimed is:

1. An apparatus for controlling display of a stereoscopic image, comprising:
   a display control portion which cuts out a stereoscopic image in a to-be-displayed area which is an area corresponding to a part of a stereoscopic image consisting of a plurality of images with a parallax, and displays the cut-out stereoscopic image on a display portion;
   a parallax change amount calculation portion which calculates a change amount between a parallax amount in a stereoscopic image within the to-be-displayed area before the to-be-displayed area is moved and a parallax amount in a stereoscopic image within the to-be-displayed area after the to-be-displayed area is moved by a first moving distance when an instruction to move the to-be-displayed area is issued; and
   a to-be-displayed area movement control portion which moves the to-be-displayed area by a moving distance in accordance with the change amount calculated by the parallax change amount calculation portion.

2. The apparatus for controlling display of a stereoscopic image according to claim 1, further comprising:
   a moving distance setting portion which sets a second moving distance smaller than the first moving distance as the moving distance by which the to-be-displayed area is moved in accordance with the instruction when the change amount is larger than a threshold and which sets the first moving distance as the moving distance by which the to-be-displayed area is moved in accordance with the instruction when the change amount is not larger than the threshold; wherein:
   the to-be-displayed area movement control portion moves the to-be-displayed area by the moving distance set by the moving distance setting portion.

3. The apparatus for controlling display of a stereoscopic image according to claim 2, further comprising:
   a moving distance generating portion which obtains the second moving distance based on at least the change amount.

4. The apparatus for controlling display of a stereoscopic image according to claim 3, further comprising:
   a primary subject detection portion which detects a primary subject contained in the stereoscopic image; and
   a subject display pixel number calculation portion which obtains the number of display pixels of the primary subject contained in the stereoscopic image within the to-be-displayed area before movement; wherein:
   the moving distance generating portion obtains the second moving distance based on the change amount and the number of display pixels of the primary subject.

5. The apparatus for controlling display of a stereoscopic image according to claim 4, further comprising:
   a display portion information acquisition portion which acquires information about a display area and the number of display pixels of the display portion; and
   a subject display area calculation portion which obtains a display area of the primary subject on the display portion based on the number of display pixels of the primary subject calculated by the subject display pixel number calculation portion and the information about the display area and the number of display pixels of the display portion; wherein:
   the moving distance generating portion obtains the second moving distance based on the change amount and the display area of the primary subject.

6. The apparatus for controlling display of a stereoscopic image according to claim 5, further comprising:
   a distance information acquisition portion which obtains information about a distance between the display portion and an observer who observes the display portion; wherein:
   the moving distance generating portion obtains the second moving distance based on the change amount, the display area of the primary subject, and the distance.

7. The apparatus for controlling display of a stereoscopic image according to claim 2, further comprising:
   a moving distance setting information display control portion which displays, on the display portion, information which makes it possible to identify a fact that the moving distance of the to-be-displayed area to be moved in accordance with the instruction has been set at the second moving distance when the moving distance has been set at the second moving distance.

8. The apparatus for controlling display of a stereoscopic image according to claim 2, further comprising:
   a parallax amount calculation portion which obtains parallax amounts of subjects in the whole of the stereoscopic image consisting of the plurality of images with the parallax;
   a region calculation portion which obtains a region where, when the to-be-displayed area moves into the region by the first moving distance, the change amount between before and after the movement of the to-be-displayed area will exceed the threshold, based on the parallax amounts obtained by the parallax amount calculation portion; and
   a region image display control portion which displays an image indicating the region obtained by the region calculation portion, on the display portion together with the stereoscopic image which is being displayed on the display portion.

9. The apparatus for controlling display of a stereoscopic image according to claim 2, wherein:

when the change amount is not higher than the threshold in a state where the moving distance of the to-be-displayed area to be moved in accordance with the instruction has been set at the second moving distance, the moving distance setting portion sets the moving distance of the to-be-displayed area to be moved in accordance with the instruction, into a plurality of moving distances the total of which corresponds the first moving distance; and the to-be-displayed area movement control portion moves the to-be-displayed area stepwise by the plurality of moving distances when the plurality of moving distances are set.

10. The apparatus for controlling display of a stereoscopic image according to claim 1, wherein:

the parallax change amount calculation portion which sets a parallax amount in the stereoscopic image within the to-be-displayed area as one of a parallax amount of a primary subject contained in the to-be-displayed area, a maximum value of parallax amounts of subjects contained in the to-be-displayed area, a peak value of a histogram of parallax amounts of subjects contained in the to-be-displayed area, and an average value of parallax amounts of subjects contained in the to-be-displayed area.

11. An imaging apparatus comprising:
the apparatus for controlling display of a stereoscopic image according to claim 1;
the display portion;
an imaging portion which images subjects; and
an image processing portion which generates stereoscopic image data for displaying the stereoscopic image, from a plurality of photographic image signals obtained by photographing with the imaging portion.

12. A method for controlling display of a stereoscopic image, comprising:

a display control step of cutting out a stereoscopic image in a to-be-displayed area which is an area corresponding to apart of a stereoscopic image consisting of a plurality of images with a parallax, and displaying the cut-out stereoscopic image on a display portion;

a parallax change amount calculation step of calculating a change amount between a parallax amount in a stereoscopic image within the to-be-displayed area before the to-be-displayed area is moved and a parallax amount in a stereoscopic image within the to-be-displayed area after the to-be-displayed area is moved by a first moving distance when an instruction to move the to-be-displayed area is issued; and a to-be-displayed area movement control step of moving the to-be-displayed area by a moving distance in accordance with the change amount calculated in the parallax change amount calculation step.

* * * * *